E. J. ANDREWS.
DYNAMO ELECTRIC MACHINE.
APPLICATION FILED APR. 18, 1914.
1,258,176.
Patented Mar. 5, 1918.
4 SHEETS—SHEET 1.
FIG. 1.
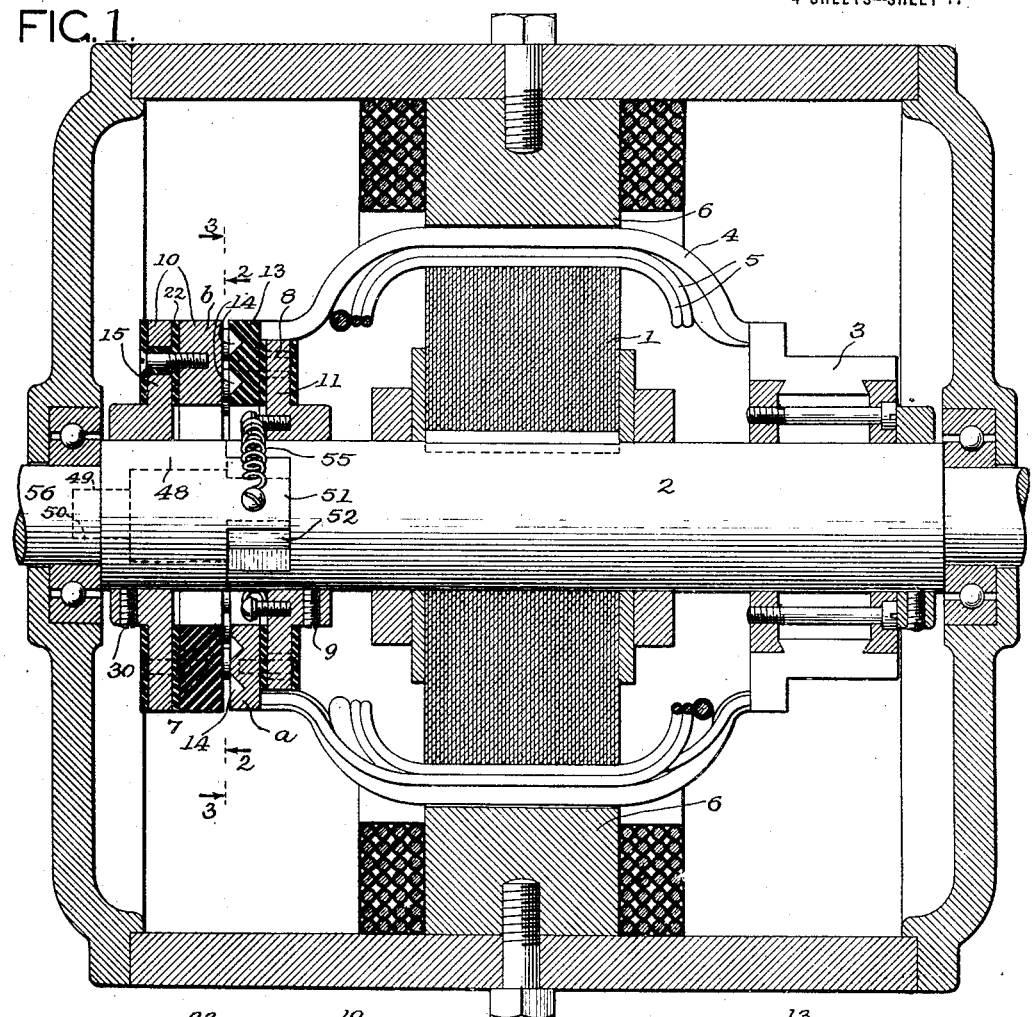
FIG. 2.
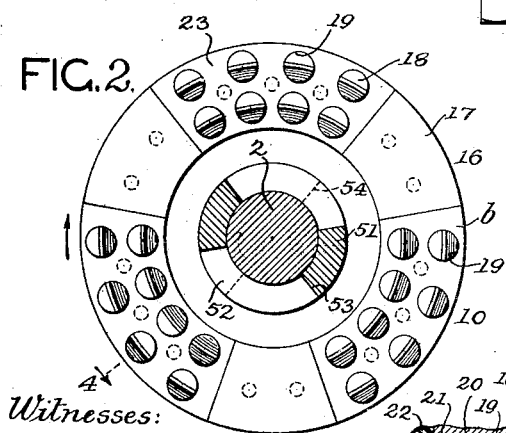
FIG. 3.
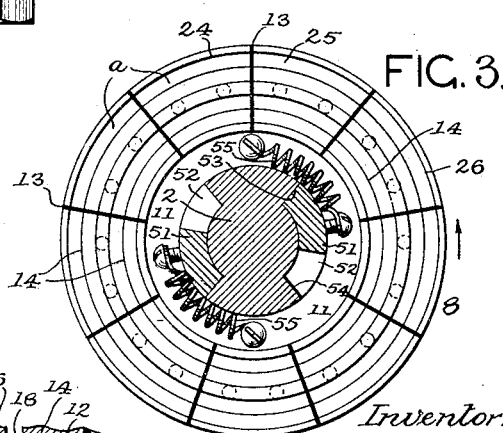
FIG. 4.
Witnesses:
J. C. Devick.
W. G. Heilman.
Inventor:
Ernest J. Andrews.
By George L. Chindahl
atty

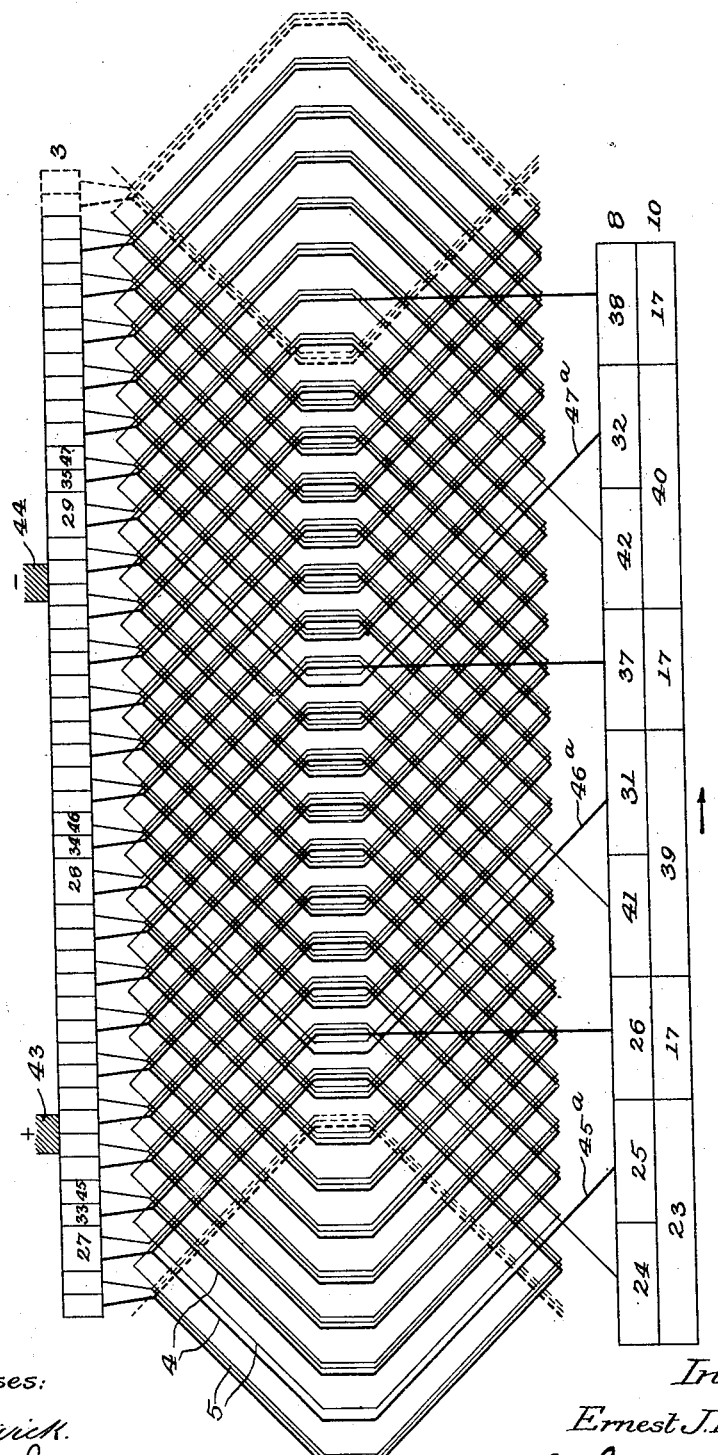

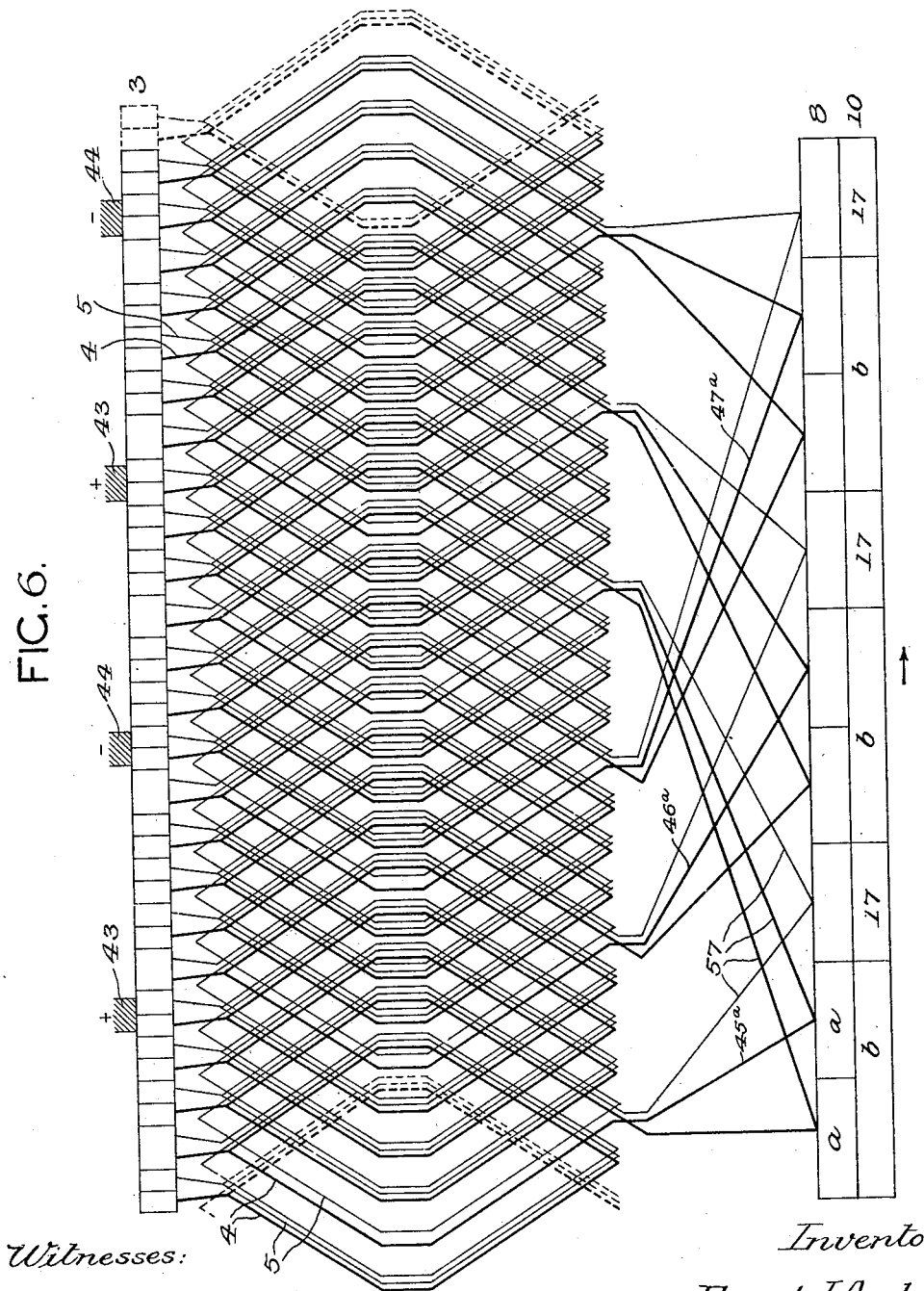

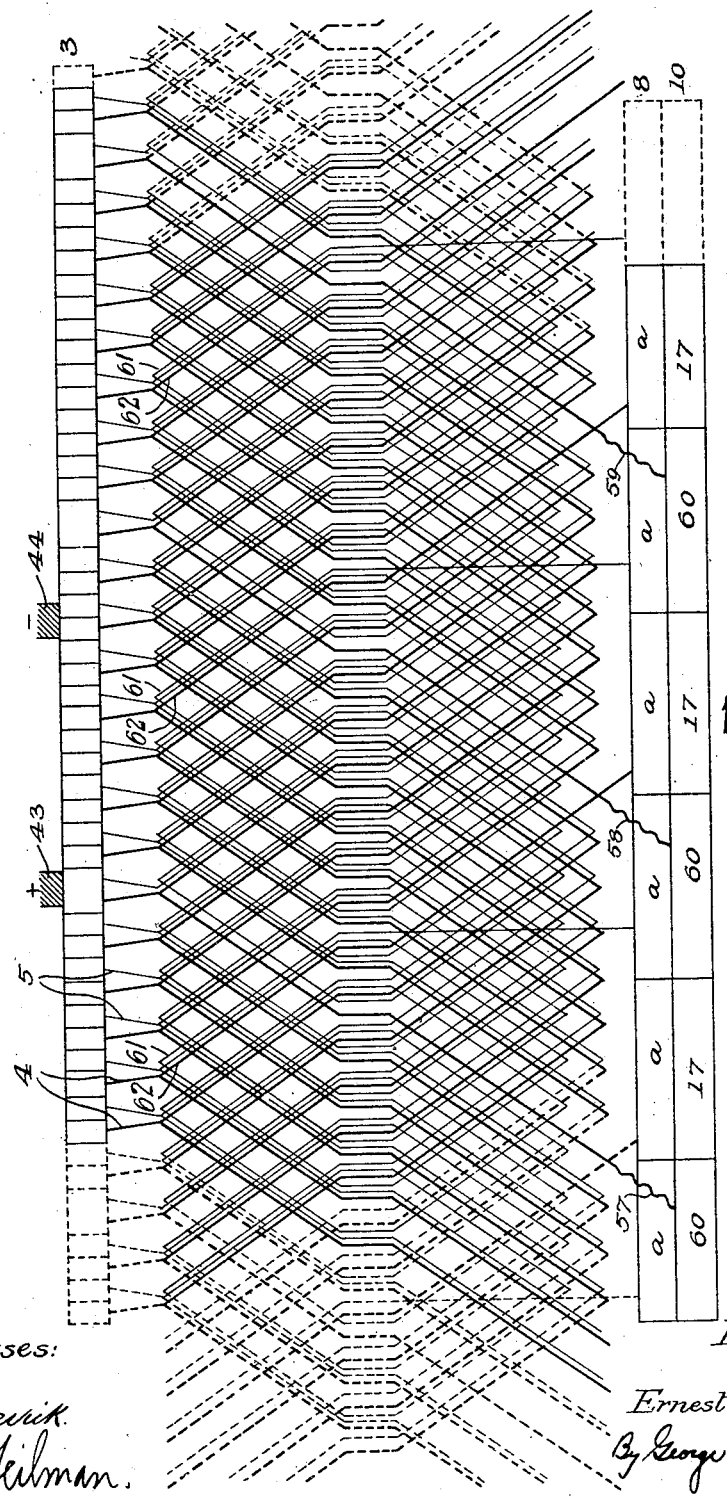

UNITED STATES PATENT OFFICE.

ERNEST J. ANDREWS, OF LOMBARD, ILLINOIS, ASSIGNOR OF ONE-FOURTH TO GEORGE L. CHINDAHL, OF CHICAGO, ILLINOIS.

DYNAMO-ELECTRIC MACHINE.

1,258,176.   Specification of Letters Patent.   Patented Mar. 5, 1918.

Application filed April 13, 1914. Serial No. 832,679.

*To all whom it may concern:*

Be it known that I, ERNEST J. ANDREWS, a citizen of the United States, residing at Lombard, in the county of Dupage and State of Illinois, have invented certain new and useful Improvements in Dynamo-Electric Machines, of which the following is a specification.

This invention relates to dynamo-electric machines and particularly to that class of such machines, which as motors may be used with different voltages or for different speeds, or which as generators may be used to generate different electro-motive forces at the same speed or similar electro-motive forces at different speeds.

The object of the invention is to provide a simple method by which the number of active conductors in the armature of the machine may be varied, so as to vary the electro-motive force generated therein, and to provide simple means for carrying out the method.

In the accompanying drawings, Figure 1 is a cross sectional view of a dynamo-electric machine embodying the features of my invention. Fig. 2 is a section along the line 2—2 of Fig. 1. Fig. 3 is a section along the line 3—3 of Fig. 1. Fig. 4 is an enlarged detail section along the line 4—4 of Fig. 2. Fig. 5. is a diagrammatic representation of the windings of the armature of the machine, which illustrates one of the windings used in carrying out my invention. Figs. 6 and 7 are diagrams of modified windings which may be used.

It is well understood that when the number of active conductors in series in an armature is varied, other conditions remaining the same, the electro-motive force generated in the armature, when acting as a generator or as a motor, will vary accordingly; and in carrying out my invention I make use of this fact. In general, the method employed is to place upon the armature of the machine two complete independent windings, each of which is connected to alternate commutator segments independently of the other windings substantially in the manner usual with duplex windings. Any ordinary windings may be used and also any number of coils in each winding or of turns in the coils that may be desired. When thus connected, the sets of windings are in parallel, but as, in order to carry out the invention it is necessary to have unequal numbers of active conductors in series in the windings, such parallel operation of the windings would be impracticable and undesirable. I, therefore, render dead one of the sets of windings by opening certain of the coils of the circuits of that set of windings so that current cannot flow therethrough from one brush of the machine to the other. The other windings then become the active windings and the machine operates substantially as if the dead windings were omitted. When it is desired to change the speed or the electro-motive force generated, the open circuits are closed, and the other circuits are opened, by some convenient means.

The means employed for opening and closing the circuits in this instance consists of a switch placed on the rear end of the armature shaft, the switch having contacts to which the respective circuits are connected at three different points. These contacts are opened or closed as desired, and when opened it is impossible for the current to pass from one brush to the other through the particular winding, as in each instance one of the open points will be in the circuit of that winding between any two brushes. And this will be true with reference to any type of winding with any number of poles or brushes which may be used.

In Fig. 1 of the drawings the armature core 1 is mounted on the shaft 2, and fixed thereto in the usual manner. The commutator 3 is also fixed to the shaft in the usual manner and has connected to its respective segments the respective terminals of all of the windings. The windings of the armature in this instance consists of two independent sets of windings 4 and 5. The windings 4 are composed of one or more turns of large wire and the windings 5 are composed of a greater number of turns of finer wire. It is to be understood that the number of turns in the respective coils or the sizes of the wires is immaterial so far as the invention is concerned. 6 indicates the fields of the motor, which may be of any suitable form. The circuit-breaker 7 is mounted on the rear end of the armature shaft and comprises a member 8 which is fixed to the armature shaft by means of a set-screw 9 or in any suitable manner, and a movable member 10, which is rotatable with reference to said shaft and with reference to the fixed member.

In this instance the fixed member of the circuit-breaker comprises a disk 11 upon which there is mounted in any suitable manner a plurality of metallic segments $a$, separated from each other by insulation pieces 13 and insulated in any suitable manner from the disk 8. Across the face of each of these segments $a$ are grooves 14, the grooves crossing the insulation strips and coinciding with each other so as to form complete annular grooves on the face of the fixed member. As is indicated in Figs. 5, 6 and 7, certain coils of each of the windings are connected to certain of these segments, and, as will be shown hereinafter, these connections are such that one of the sets of windings is always necessarily dead and the other set is always operatively connected.

The movable member of the circuit-breaker comprises a disk 15 which is rotatable with reference to the shaft 2. Upon the face of this disk are, in this instance, three metallic contact holders $b$. These holders are insulated from the disk 15 and are insulated from each other by pieces 17. Each of these holders carries a plurality of contact pieces 18 which project from the face of the holders and project into the grooves 14 of the fixed member. These contacts play freely in openings 19 in the holders, and are backed by spring 20 which are in turn backed by screws 21. Contact between the disk 15 and the holders, as well as the screws 21, is prevented by means of an insulation ring 22.

The movable disk faces the fixed disk, as indicated in Fig. 1, so that the contacts 18 are in the grooves 14; and as each of the holders with its contacts has substantially the same angular dimension as two of the segments $a$ of the fixed disk, each of such holders connects electrically two segments. And when rotated, as will be explained hereinafter, the holders of the movable disk pass from one of the segments on to another, so that, for instance, when the movable member is in one position, holder 23 will connect segments 24 and 25 of the fixed member and when the movable member is rotated, in order to close one set of circuits and open the other, the holder 23 will connect segments 25 and 26, the rotation of the movable disk being through an angle equal to the angular dimension of one of the segments 12.

In this instance I have selected for the purposes of illustration a 2-pole machine with 24 coils in each of the independent windings, as indicated in Fig. 5. It will be seen that the heavy windings 4 are connected to the alternate commutator segments in the manner usual with duplex windings. The coils of this winding, however, which are connected respectively with the commutator segments 27, 28 and 29, do not return to the respective alternate commutator segments in the usual manner, but pass respectively to the circuit-breaker segments 25, 31 and 32, while the wires of the winding 4 which are connected to the respective commutator segments 33, 34 and 35, are also connected respectively to the circuit-breaker segments 26, 37 and 38. In view of this, while the movable member 10 is in the position indicated in Fig. 5, with the insulation pieces 17 in contact with segments 26, 37 and 38, the contacts 18 of the holders 23, 39 and 40, respectively, electrically connect the segments 24 and 25, 41 and 31, and 42 and 32. The entire winding 4 is then open and inoperative. In such a case it will be seen that no current could pass from brush 43 to brush 44 through windings 4, no matter in what position the commutator might be with reference to these brushes. Yet when the movable member is shifted one segment to the right, segments 25 and 26, 31 and 37, and 32 and 38 would be connected respectively, and the heavy windings 4 would be operative.

Now, inasmuch as wires $45^a$, $46^a$ and $47^a$ connect at all times the respective segments 27, 28 and 29 to the segments 25, 31 and 32, current can at all times pass from these respective commutator segments to the respective circuit-breaker segments. For this reason there is no wire in the light windings 5 corresponding to the wires $45^a$, $46^a$ and $47^a$ of the windings 4. Otherwise it will be seen that windings 5 are connected to the commutator segments in the same manner as windings 4; and three of the coils of windings 5, corresponding to the three coils of windings 4, are connected respectively to the segments 24, 41 and 42 of the fixed member 8 of the circuit-breaker, and to segments 45, 46 and 47 of the commutator. And when the movable member 10 is in the position shown in Fig. 5, the coils of the windings 5 connected respectively to the segments 45, 46 and 47 will be closed and the windings 5 are operatively connected to the commutator in the ordinary manner, but when the movable member is shifted one segment to the right these coils are open. From this it will be seen that either set of windings of the armature may be made operative and the other inoperative by merely shifting the movable member of the circuit-breaker to the proper position.

Any suitable means may be used for shifting the movable member of the circuit-breaker from one position to the other. I have illustrated herein a means for producing this result which will now be explained.

One of the uses to which the dynamo machine herein described may be put is for starting and generating purposes in connection with engines which are not self-starting, such as gasolene engines used on automobiles, and the means which I illustrate herein for shifting the movable member of the circuit-breaker may be conveniently applied to the dynamo when used for such purposes. In such a case the shaft 56 is connected in any suitable manner, directly or indirectly, to the driving shaft of the engine. Fixed to the shaft 56 is a sleeve 48, into which passes the rear end of the shaft 2, an extension 49 of the shaft 2 passing into a circular opening 50 in the end of the shaft 56. When so arranged the two shafts are rotatable with reference to each other. Lugs 51 project from the wall of the sleeve 48 into recesses 52 in the periphery of the shaft 2, thus limiting the relative rotation of the shafts. The angular dimensions of these recesses and lugs are such that the shafts are rotatable with reference to each other through an angle substantially equal to the angular dimension of the segments $a$. The movable member of the circuit-breaker is fixed, in any suitable manner, such as by means of the screw 30, to the sleeve of the shaft 56.

It will be seen that, by this arrangement of the various parts, if when lugs 51 are in contact with shoulders 53 of the shaft, as indicated in Fig. 3, the contacts 18 of the holders $b$ bridge respectively two segments $a$, so as to cause them to be electrically connected; and when the two shafts are rotated with reference to each other so that the lugs 51 come against shoulders 54 the movable holders will each pass from one segment $a$ onto another, being shifted the proper distance to disconnect the segments of one set of windings and connect the segments of the other windings.

Hence, when the current is turned upon the dynamo for the purpose of starting the engine, if the direction of rotation of the armature is clockwise when viewing the commutator end, or when viewing Fig. 2, shaft 56 will be held stationary by the engine until the shaft 2 rotates so as to bring the shoulders 54 against the lugs 51, and, if properly adjusted, the contacts 18 will then electrically connect respectively segments 25 and 26, 31 and 37, and 32 and 38, so as to close the windings 4, and as this winding is composed of the large wire with but single turns, the speed of the dynamo, and hence the power capacity will be greater than would be the case if windings 5 only were operating.

When, however, the engine begins to run under its own power with a speed sufficiently great it will tend to rotate the shaft 2 by means of the shaft 56 and relative rotation of the shafts will again take place until lugs 51 come in contact with shoulders 53 and the circuit-breaker will close the windings 5 and open the windings 4. As windings 5 have a larger number of active conductors in series than windings 4, the electro-motive force generated therein will be proportionally greater than that generated in the windings 4, and if properly arranged the electromotive force generated will be sufficient to charge the battery.

In order to insure the shifting of the movable segments when the engine begins to run under its own power, springs 55 may be used. As is indicated in Figs. 1 and 3, one end of each of these springs is connected to one of the lugs 51 and the other end to the fixed disk 11. As a consequence of this arrangement, whenever the motor is not driving the shaft 56 the springs will rotate shaft 2 with reference to shaft 56 until lugs 51 come in contact with shoulders 53, and the generating windings 5 will then be closed.

Fig. 6 shows a modified winding to which this improvement may be applied. This winding is the ordinary four-pole lap winding with cross-connecting wires 57. These wires connect with the same contact pieces $a$ the respective coils which are diametrically opposite to each other on the armature and which are to be opened by the circuit-breaker. It is well understood that, in a four-pole armature, the electric and magnetic characteristics of any two coils which are diametrically opposite to each other, are exactly the same, and wires cross-connecting these coils are an advantage instead of a disadvantage as they tend to reduce local currents and sparking, and by thus cross-connecting the coils the number of contacts in the circuit-breaker is the same as with the two-pole winding. In all other respects the description hereinabove given of the two-pole winding and its relation to the circuit-breaker applies to this modified winding.

Fig. 7 shows another modification. This winding is the ordinary simplex wave winding, having 23 coils instead of 24, and having 3 points where the circuits are disconnected as in case of the other windings. In this instance, however, in order to simplify the circuit-breaker, I have shown 3 leads 57, 58 and 59 leading to the movable member of the circuit-breaker, these leads being flexible. The contact pieces 60 to which these leads are respectively connected, in one position of the movable member 10 are in contact respectively with one of the segments $a$ and with the adjacent segment $a$ when the movable member is shifted to its other position. When the contact pieces 60 are in the position shown in Fig. 7, the flexible wires, 57, 58 and 59 are connected respectively with the segments *a* which are connected respectively to coils 61 thus closing one of the circuits through the armature; and as the contact pieces 17 are not connected with any wires, the coils 62 of the other circuit are disconnected. On the other hand when pieces 60 are shifted to the right, the flexible leads 57, 58 and 59 are brought in contact respectively with the segments connected with the coils 62 of one circuit; hence this circuit is closed and the circuit previously closed is at the same time opened. As a consequence of this arrangement, the number of contacts in the circuit-breaker is reduced by 3.

It is to be understood also that other modifications in the windings or in the structure shown herein might be introduced by those skilled in the art without departing from the spirit of the invention as set forth in the following claims.

I claim as my invention:

1. An armature of a dynamo-electric machine, comprising a core, a commutator, two sets of coils mounted on said armature; the coils of one of said sets connected to said commutator and in series with each other, the coils of the other of said sets also connected to said commutator and in series with each other, thereby forming two circuits through said armature, and means for disconnecting each of said circuits.

2. A dynamo-electric machine comprising an armature, said armature having two independent sets of coils mounted thereon, a commutator and one set of brushes only coacting with said commutator, each of said sets of coils being connected with said commutator, and means for disconnecting, while said armature is rotating, one only of said sets of coils from operative connection with said brushes.

3. In a dynamo-electric machine, an armature, said armature having two circuits therethrough, each connected to the same commutator, and means for disconnecting one of said circuits and connecting the other of said circuits while said armature is rotating.

4. In a dynamo-electric machine, an armature having a plurality of circuits therethrough, all of said circuits being connected to the same commutator, and means mounted on the shaft of said armature for opening one of said circuits and simultaneously closing another of said circuits.

5. In a dynamo-electric machine, an armature having a plurality of circuits therethrough, all connected to the same commutator, and means mounted on the shaft of said armature for opening alternately said circuits; one of said circuits having more conductors in series than the other.

6. In a dynamo-electric machine, an armature comprising a plurality of circuits therethrough and a commutator, each of said circuits being operatively connected to said commutator, and means for disconnecting each of said circuits at not less than three points.

7. In a dynamo-electric machine, an armature comprising a plurality of circuits therethrough and a commutator, each of said circuits operatively connected to said commutator, and means for disconnecting each of said circuits at not less than three points, said means being mounted on the shaft of said armature.

8. In a dynamo-electric machine, an armature comprising a plurality of circuits therethrough and a commutator, each of said circuits operatively connected to said commutator, means for disconnecting each of said circuits at not less than three points, said means being mounted on the shaft of said armature, and means for operating said disconnecting means.

9. In a dynamo-electric machine, a rotor having a plurality of circuits therethrough and a shaft, means for alternately disconnecting each of said circuits, said means comprising a member fixed to said shaft, a member rotatable with reference to said shaft and means for operating said disconnecting means.

10. In a dynamo-electric machine, a rotor having a plurality of circuits therethrough and a shaft; means for alternately disconnecting each of said circuits, said means comprising a member fixed to said shaft, a member rotatable with reference to said shaft; and means for operating said disconnecting means, said operating means comprising a sleeve rotatably mounted on said shaft and fixed to said rotatable member.

11. In a dynamo-electric machine, a shaft, a magnetic core non-rotatably mounted on said shaft, a plurality of electric circuits mounted on said core; means for disconnecting each of said circuits, said means comprising a member fixed to said core and a member rotatable a limited distance with reference to said core; and means for operating said disconnecting means, said means comprising a sleeve fixed to said movable member mounted on said shaft and rotatable with reference to said shaft through a limited angle.

12. In a dynamo-electric machine, a shaft, a magnetic core non-rotatably mounted on said shaft, a plurality of electric circuits mounted on said core; means for disconnecting each of said circuits, said means comprising a member fixed to said core and a member rotatable a limited distance with reference to said core; and means for operating said disconnecting means, said means comprising a sleeve fixed to said movable member mounted on said shaft rotatable with reference to said shaft through a limited angle, said sleeve adapted to be operatively connected with a shaft of a prime mover.

In testimony whereof, I hereunto set my hand in the presence of two witnesses.

ERNEST J. ANDREWS.

In the presence of—
GEORGE L. CHINDAHL,
MARGARET H. MANN.

Copies of this patent may be obtained for five cents each, by addressing the "Commissioner of Patents, Washington, D. C."